US009123947B2

(12) United States Patent
Lee et al.

(10) Patent No.: US 9,123,947 B2
(45) Date of Patent: *Sep. 1, 2015

(54) SECONDARY BATTERY

(75) Inventors: Chiyoung Lee, Yongin-si (KR); Seokyoon Yoo, Yongin-si (KR); Yoontai Kwak, Yongin-si (KR); Dongwook Kim, Yongin-si (KR); Jongseok Moon, Yongin-si (KR); Tatsuya Hashimoto, Yongin-si (KR)

(73) Assignees: SAMSUNG SDI CO., LTD., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 362 days.

This patent is subject to a terminal disclaimer.

(21) Appl. No.: 12/929,119

(22) Filed: Jan. 3, 2011

(65) Prior Publication Data

US 2011/0287309 A1 Nov. 24, 2011

(30) Foreign Application Priority Data

May 20, 2010 (KR) .................. 10-2010-0047501

(51) Int. Cl.
*H01M 2/26* (2006.01)
*H01M 2/30* (2006.01)
*H01M 10/04* (2006.01)

(52) U.S. Cl.
CPC ............... *H01M 2/263* (2013.01); *H01M 2/30* (2013.01); *H01M 10/0431* (2013.01)

(58) Field of Classification Search
CPC ...................................... H01M 2/263
USPC ......................... 429/161, 186, 211
See application file for complete search history.

(56) References Cited

U.S. PATENT DOCUMENTS

| | | | |
|---|---|---|---|
| 6,040,086 A * | 3/2000 | Yoshida et al. | 429/211 |
| 6,235,426 B1 * | 5/2001 | Yanai et al. | 429/211 |
| 6,468,692 B1 * | 10/2002 | Nemoto et al. | 429/174 |
| 7,060,388 B2 * | 6/2006 | Naruoka | 429/161 |
| 7,541,112 B2 * | 6/2009 | Richard et al. | 429/211 |
| 2002/0061438 A1 * | 5/2002 | Inoue et al. | 429/161 |
| 2003/0044677 A1 * | 3/2003 | Naruoka | 429/161 |
| 2003/0077508 A1 * | 4/2003 | Asahina et al. | 429/160 |
| 2003/0129479 A1 * | 7/2003 | Munenaga et al. | 429/94 |
| 2003/0215706 A1 * | 11/2003 | Alunans et al. | 429/161 |
| 2004/0028999 A1 * | 2/2004 | Richard et al. | 429/149 |
| 2004/0092167 A1 * | 5/2004 | Barrault et al. | 439/621 |

(Continued)

FOREIGN PATENT DOCUMENTS

| | | | |
|---|---|---|---|
| JP | 2000-082487 A | | 3/2000 |
| JP | 2000082487 A | * | 3/2000 |

(Continued)

*Primary Examiner* — Ula C Ruddock
*Assistant Examiner* — Scott J Scmielecki
(74) *Attorney, Agent, or Firm* — Lee & Morse, P.C.

(57) ABSTRACT

A secondary battery includes a case including an internal space, at least one electrode assembly in the case, the electrode assembly including a separator between a positive electrode plate and a negative electrode plate, and the positive and negative electrode plates including uncoated portions at edges of the electrode assembly, at least one current collector piece coupled to the uncoated portions of the electrode assembly, the at least one current collector piece being inserted into an interior region of the uncoated portions, a current collector terminal coupled to the current collector piece and protruding to an upper portion of the case, and a cap plate coupled to the upper portion of the case.

20 Claims, 9 Drawing Sheets

(56) References Cited

U.S. PATENT DOCUMENTS

| | | | |
|---|---|---|---|
| 2005/0214638 A1* | 9/2005 | Asahina et al. | 429/160 |
| 2006/0051664 A1* | 3/2006 | Tasai et al. | 429/161 |
| 2006/0092593 A1* | 5/2006 | Viavattine | 361/303 |
| 2007/0117009 A1* | 5/2007 | Yamauchi et al. | 429/160 |
| 2007/0298317 A1* | 12/2007 | Brodd et al. | 429/94 |
| 2009/0087735 A1* | 4/2009 | Yoon et al. | 429/185 |
| 2010/0104645 A1* | 4/2010 | Ali et al. | 424/489 |
| 2010/0233521 A1* | 9/2010 | Byun et al. | 429/72 |
| 2010/0248029 A1* | 9/2010 | Butt et al. | 429/211 |
| 2011/0104537 A1* | 5/2011 | Lee et al. | 429/94 |
| 2011/0183191 A1* | 7/2011 | Lee et al. | 429/175 |
| 2011/0229754 A1* | 9/2011 | Zhao et al. | 429/158 |
| 2012/0180308 A1* | 7/2012 | Yamada et al. | 29/623.1 |

FOREIGN PATENT DOCUMENTS

| | | |
|---|---|---|
| JP | 2001-155711 A | 6/2001 |
| JP | 2002-279961 A | 9/2002 |
| JP | 2005-142026 A | 6/2006 |

* cited by examiner

SECONDARY BATTERY

BACKGROUND

1. Field

Embodiments relate to a secondary battery.

2. Description of the Related Art

Generally, unlike primary batteries, i.e., not chargeable batteries, secondary batteries are chargeable and dischargeable. Low-capacity secondary batteries are widely used in a variety of high-tech electronic devices, e.g., cellular phones, notebook computers, camcorders, and the like. High-capacity secondary batteries are widely used as power supplies, e.g., for electric vehicles or hybrid vehicles. The secondary battery may include an electrode assembly accommodated in a case, and electrode terminals coupled through current collector plates to the electrode assembly.

SUMMARY

Embodiments are directed to a secondary battery, which substantially overcomes one or more of the problems due to the limitations and disadvantages of the related art.

It is a feature of an embodiment to provide a secondary battery with a current collector plate structure enabling easy visual access to and monitoring of welding between the current collector plate and an electrode assembly, while exhibiting improved welding efficiency and reliability.

At least one of the above and other features and advantages may be realized by providing a secondary battery, including a case with an internal space, at least one electrode assembly in the case, the electrode assembly including a separator between a positive electrode plate and a negative electrode plate, and the positive and negative electrode plates including uncoated portions at edges of the electrode assembly, at least one current collector piece coupled to the uncoated portions of the electrode assembly, the at least one current collector piece being inserted into an interior region of the uncoated portions, a current collector terminal coupled to the current collector piece and protruding to an upper portion of the case, and a cap plate coupled to the upper portion of the case.

The current collector piece may have a smaller width than the uncoated portions.

A plurality of current collector pieces may be arranged along a width direction of the uncoated portions at each edge of the electrode assembly, each current collector piece being inserted between adjacent segments of the uncoated portions.

The current collector piece may include a pair of first regions inserted into the interior region of the uncoated portions, and a second region connecting the pair of the first regions to each other.

A segment of the uncoated portions may be in a space between the pair of the first regions.

A part of the segment of the uncoated portions in the space between the pair of the first regions may be exposed between two portions of the second region via a groove.

The uncoated portions may be welded to the current collector pieces via the groove.

The current collector piece may include a first region having a first end inserted into the interior region of the uncoated portions, and a second region bent from a second end of the first region and exposed to an exterior of the uncoated portions, the first and second ends being opposite each other.

The first region may be bent at the first end thereof, and the second end of the first region including an exposed edge and an edge connected to the second region.

The current collector piece may be arranged in multiple numbers, the first regions being coupled to second regions of adjacent current collector pieces.

The secondary battery may further include an insertion member having a curved surface of a smaller curvature than the bent first end of the first region, the insertion member being coupled to the first end of the first region.

The insertion member may taper toward its lower portion, the lower portion being inserted in the interior region of the uncoated portions.

A bottommost end of the insertion member may be curved.

The second region may be positioned at an inclined angle with respect to a width direction of the uncoated portions.

A first end of the current collector piece may be inserted into the interior region of the uncoated portions, and a second end of the current collector piece is coupled to an exterior of the uncoated portion, the first and second ends of the current collector piece being opposite each other.

The current collector piece may include a first portion extending into the interior region of the uncoated portions, the first portion extending in parallel to a major surface of the case and overlapping the uncoated portions, and a second portion connected to the first portion and perpendicular thereto, the second portion being connected to an external region of the uncoated portions.

The second portion may include a groove between parts of the second portion, the parts of the second portion protruding further than the groove.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
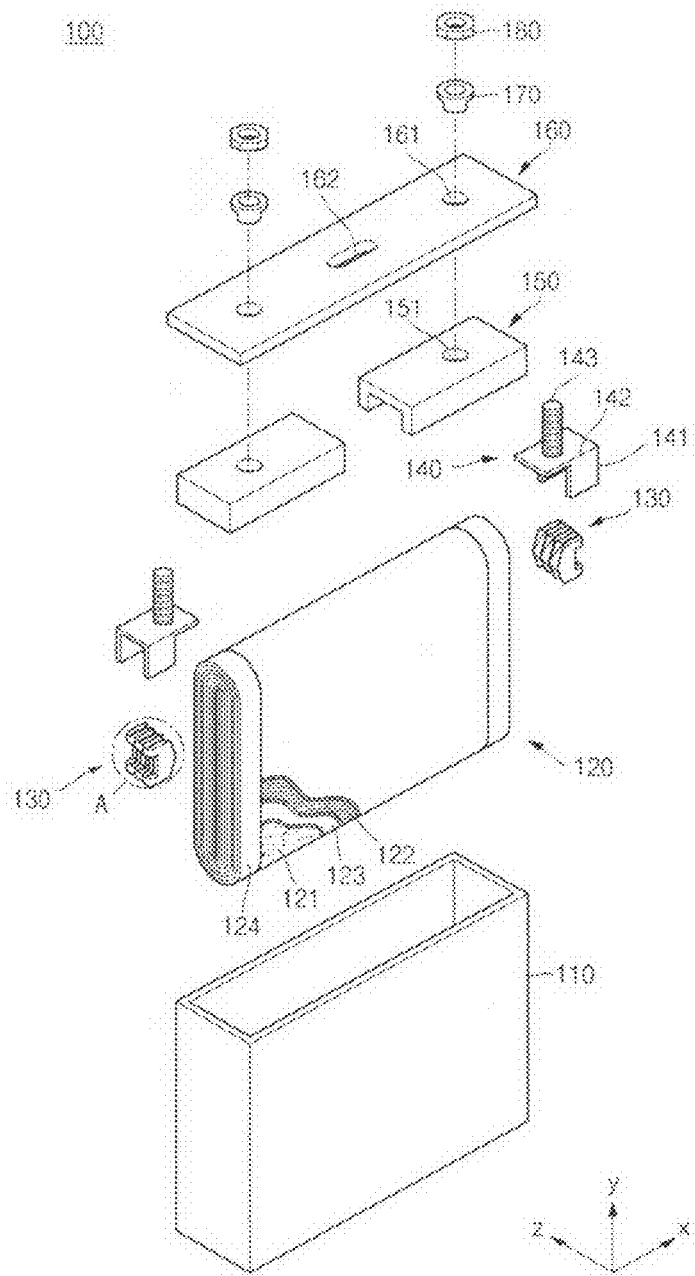
FIG. 1 illustrates an exploded perspective view of a secondary battery according to an embodiment.

Korean Patent Application No. 10-2010-0047501, filed on May 20, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

A secondary battery according to an embodiment will now be described with reference to FIG. 1. FIG. 1 illustrates an exploded perspective view of a secondary battery.

Referring to FIG. 1, the secondary battery 100 may include a case 110, an electrode assembly 120 accommodated in the case 110, at least one current collector piece 130 electrically connected to the electrode assembly 120, a current collector terminal 140 electrically connected to the at least one current collector piece 130, a first dielectric body 150 through which the current collector terminal 140 passes, a cap plate 160 coupled to an upper portion of the first dielectric body 150, and a second dielectric body 170 passing through the cap plate 160 and coupled to the current collector terminal 140. In addition, a nut 180 may further be coupled to the current collector terminal 140.

The case 110 may have any suitable shape, e.g., a hexahedral shape, and may have an internal space. The case 110 may be made of a conductive metal, e.g., aluminum, an aluminum alloy, a nickel plated steel, etc.

The electrode assembly 120 may be accommodated in the internal space of the case 110. The electrode assembly 120 may include a positive electrode plate 121, a negative electrode plate 122, and a separator 123 interposed therebetween. The electrode assembly 120 may be formed by winding a stack of the positive electrode plate 121, the negative electrode plate 122, and the separator 123 in a jelly-roll configuration. In the illustrated embodiment, for brevity, only one electrode assembly 120 is provided in the case 110. However, the electrode assembly 120 may be provided in multiple numbers in alternative embodiments.

In addition, the electrode assembly 120 may include uncoated portions 124 of the positive and negative electrode plates 121 and 122 at both ends of the case 110. The uncoated portions 124 may be provided as a pair. That is, uncoated portions 124 may be provided at one end of the electrode assembly 120 to be connected to the positive electrode plate 121, and uncoated portions 124 may be provided at an opposite end of the electrode assembly 120 to be connected to the negative electrode plate 122.

The uncoated portions 124 may be coupled to the current collector piece 130 by welding. For example, after the uncoated portions 124 are fixed by a plurality of current collector pieces 130, the uncoated portions 124 may be welded to the current collector pieces 130. Therefore, charging and discharging operations may be performed in the uncoated portions 124 by the current collector pieces 130.

In detail, the uncoated portions 124 may be partitioned by the current collector pieces 130, and may be compressed along the width direction of the uncoated portions 124, e.g., along the z-axis, according to the pressure applied to the current collector piece 130, as will be described in more detail below. Accordingly, the uncoated portions 124 may be welded to the current collector pieces 130 without having a gap therebetween, thereby improving welding efficiency. In addition, since welding is carried out on a side surface of the uncoated portions 124, i.e., a surface parallel to a major surface of the case 110 in the xy-plane, it may be possible to prevent a welding beam from reaching the electrode assembly 120, thereby increasing protection of the electrode assembly 120 during welding. Further, since welding is carried out in a state in which the uncoated portions 124 are exposed through an opening, e.g., a groove, in the current collector piece 130, the welding may be efficiently performed.

The current collector piece 130 may be coupled to the uncoated portions 124. As illustrated in FIG. 1, the secondary battery 100 may include a plurality of current collector pieces 130 on each side of the electrode assembly 120. The plurality of current collector pieces 130 on each side of the electrode assembly 120 may be arranged along a width of the uncoated portions 124, i.e., the current collector pieces 130 may be arranged between two opposite surfaces of the electrode assembly 120 along a direction substantially perpendicular to a major surface of the case 110. Each current collector piece 130 may include two plates formed in pair to define a predetermined region of each of the uncoated portions 124. The current collector piece 130 may be inserted into the predetermined region of the uncoated portion 124, and may be welded with the uncoated portions 124 to form a charge/discharge path of the electrode assembly 120.

Figure 2:
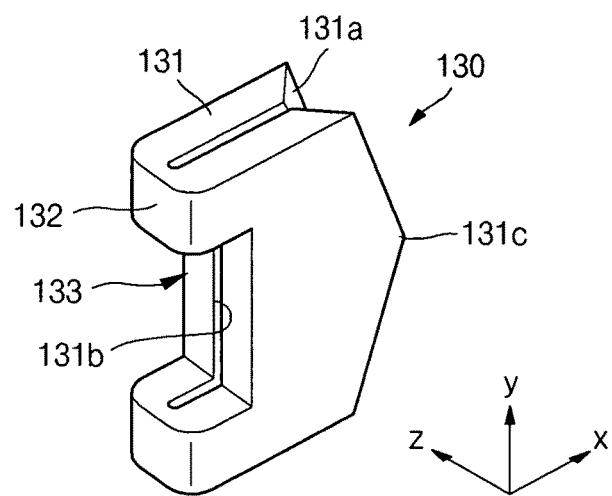
FIG. 2 illustrates an enlarged perspective view of a current collector piece in portion 'A' of FIG. 1.
Figure 4:
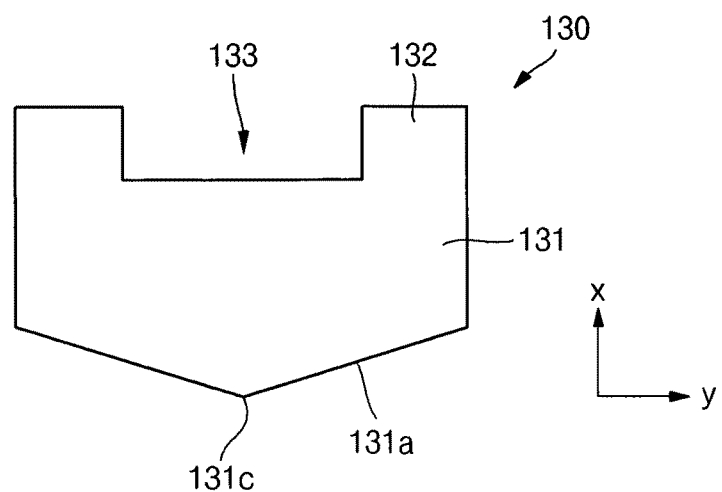
FIG. 4 illustrates a side view of the current collector piece of FIG. 2.
Figure 5:
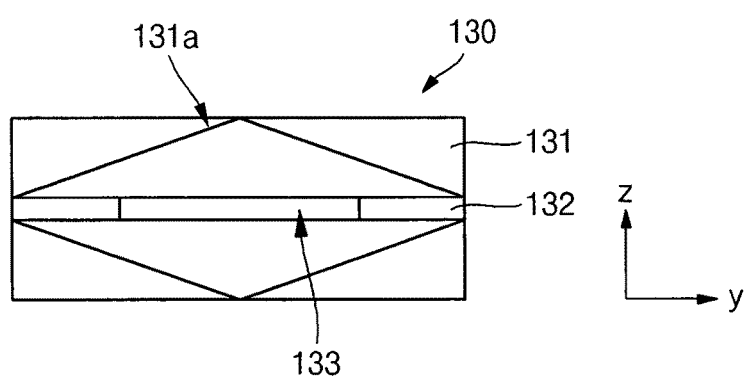
FIG. 5 illustrates another side view of the current collector piece of FIG. 2.
Figure 6:
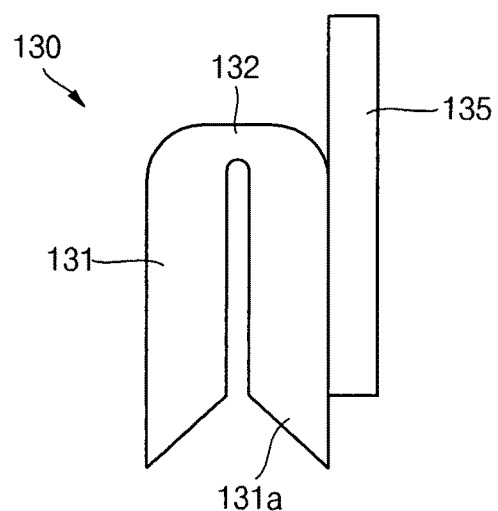
FIG. 6 illustrates a top plan view of a welding plate coupled to the current collector piece of FIG. 2.
Figure 7:
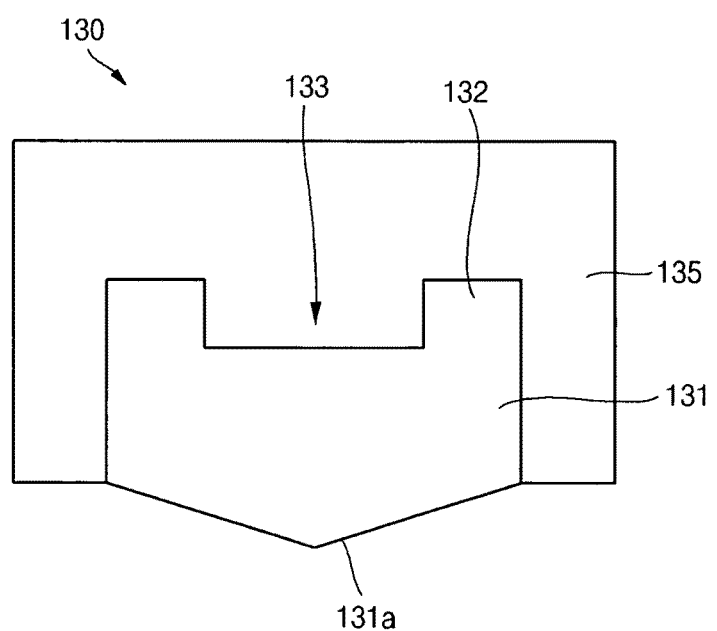
FIG. 7 illustrates a side view of the welding plate coupled to the current collector piece of FIG. 2.
Figure 8:
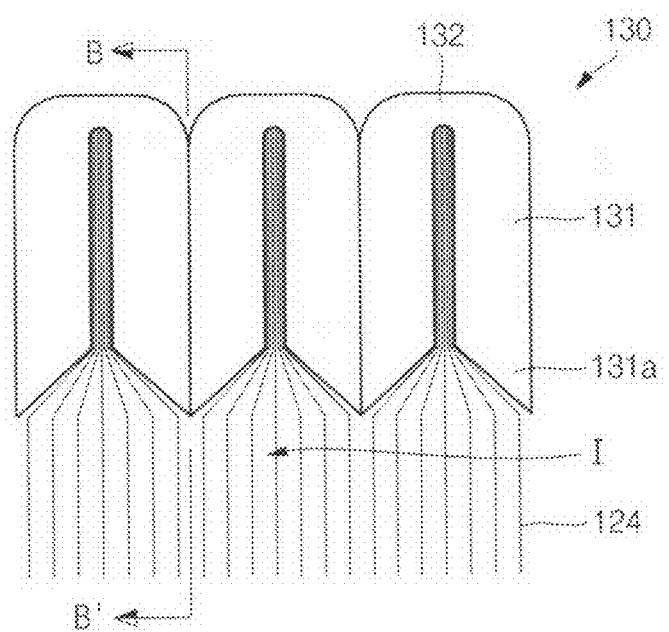
FIG. 8 illustrates a top plan view of uncoated portions coupled to the current collector pieces of FIG. 2.
Figure 9:
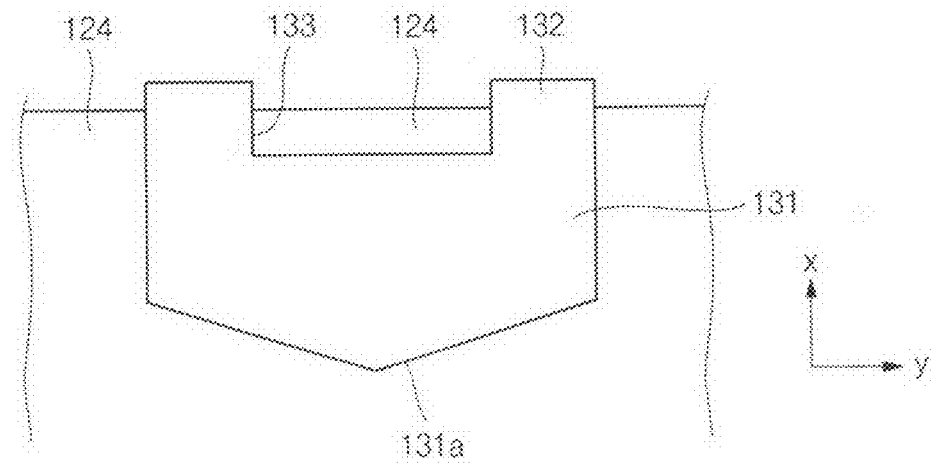
FIG. 9 illustrates a cross-sectional view taken along line B-B' of FIG. 8.

The structure of the current collector pieces 130 and their attachment to the uncoated portions 124 will be described in more detail hereinafter with reference to FIGS. 2-9. FIG. 2 illustrates an enlarged perspective view of the current collector piece 130 in portion 'A' of FIG. 1, FIG. 3 illustrates a top plan view of the current collector piece 130, FIG. 4 illustrates a side view of the current collector piece 130, FIG. 5 illustrates another side view of the current collector piece 130, FIG. 6 illustrates a front view of a welding plate coupled to the current collector piece 130, FIG. 7 illustrates a top plan view of a welding plate coupled to the current collector piece 130, FIG. 8 illustrates a top plan view of the uncoated portions 124 coupled to the current collector pieces 130, and FIG. 9 illustrates a cross-sectional view along line B-B' of FIG. 8.

Figure 3:
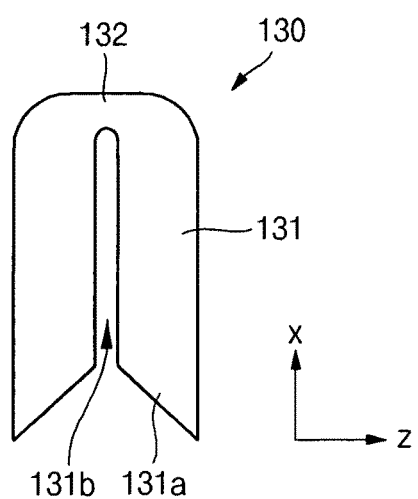
FIG. 3 illustrates a top plan view of the current collector piece of FIG. 2.

Referring to FIGS. 2-3, the current collector piece 130 may include a pair of first regions 131 and a second region 132 connecting first end portions, e.g., upper portions, of the pair of the first regions 131. In detail, the pair of the first regions 131 may extend in parallel to each other, and may be connected only at one side to each other via the second region 132, e.g., to define a U-shaped cross section as viewed from a top plan view (FIG. 3). That is, the second region 132 allows the pair of the first regions 131 to be incorporated into one piece by connecting the first regions 131. As such, as illustrated in FIG. 3, a space 131b may be defined between the pair of the first regions 131. The current collector piece 130 may be oriented so the space 131b may face an interior region I (FIG. 8) between the uncoated portions 124 from a side surface of the uncoated portions 124. Therefore, as illustrated in FIG. 8, the current collector piece 130 may be inserted into the interior region I between the uncoated portions 124 via the space 131b, so the first regions 131 may be positioned in the interior region I between the uncoated portions 124. That is, a segment of the uncoated portions 124 may be between the pair of the first regions 131 of one current collector piece 130 to define a predetermined region of the uncoated portion 124. The first regions 131 may be inserted into the interior region I between the uncoated portions 124 and compressed using an elastic force in a direction in which the uncoated portions 124 are arranged, i.e., in a width direction of the uncoated portions 124 along the z-axis. It is noted that the interior region I of the uncoated portions 124 refers to a region within the electrode assembly 120, e.g., a distance between the interior region I and a center of the electrode assembly 120 is smaller than a distance between an outermost edge of the electrode assembly 120 and the center of the electrode assembly 120, so the interior region I may not be exposed to external surroundings of the electrode assembly 120.

As further illustrated in FIGS. 2-3, each of the first regions 131 may include inclined surfaces 131a at second end portions opposite the first and portions, e.g., at lower portions, of the first regions 131. The inclined surfaces 131a may form a slope along the width direction of the uncoated portions 124, e.g., the inclined surface 131a may be at an oblique angle with respect to the space 131b. Therefore, when the first regions 131 are inserted between the uncoated portions 124, the uncoated portions 124 may be guided to move along the inclined surface 131a, e.g., slide along the inclined surfaces 131a toward the space 131b. As such, the inclined surfaces 131a allow the first regions 131 to be easily inserted into the interior between the uncoated portions 124.

As further illustrated in FIG. 2, the first regions 131 may include an edge region 131c positioned at the second end portions of the first regions 131, and may protrude away from the second region 132. The edge region 131c may include a vertex, so the second end portion of the first region 131 may have a cross section of a triangle as viewed from a side view (FIG. 4), e.g., may resemble a head of an arrow. Therefore, when the first regions 131 are inserted between the uncoated portions 124, the edge region 131c may be inserted first, thereby allowing the first regions 131 to be more easily inserted into the interior region I between the uncoated portions 124. Since the uncoated portions 124 are located in an interior region I between the paired first regions 131, they may be securely fixed using elasticity of the first regions 131.

As further illustrated in FIGS. 2, 4 and 5, the current collector piece 130 may include a groove 133, which exposes the first end portion, e.g., upper portions, of the first regions 131 (FIG. 9). The groove 133 may be formed at a location defined by opposite sides of the second region 132. That is, the groove 133 may extend along the y-axis to expose surfaces of the first regions 131, e.g., surfaces in the yz-plane facing away from the edge region 131c, and to expose the space 131b (FIG. 2). As such, two portions of the second region 132 may be separated from each other by the groove 133 along the y-axis. Therefore, a section of the uncoated portion 124 that is inserted into the space 131b may extend through the space 131b to contact the second region 132 and to be exposed via the groove 133, as illustrated in FIGS. 8-9. In such a state, the uncoated portion 124 may be welded with the first regions 131. Therefore, even after the uncoated portions 124 are welded, a welding state of the uncoated portions 124 may be easily detected externally.

Here, the first regions 131 may be compressed in a direction in which the current collector pieces 130 are arranged, e.g., along the z-axis, and may be welded to the uncoated portions 124 with substantially no gap existing therebetween. In addition, the welding may be performed by butt welding. Therefore, welding efficiency of the uncoated portions 124 may be enhanced.

In addition, even if the electrode assembly 120, i.e., the uncoated portions 124, is provided in various sizes and multiple numbers, the current collector pieces 130 may be coupled to the uncoated portions 124, regardless of the size and number of the electrode assembly 120, as long as the current collector pieces 130 are provided in numbers corresponding to the entire width of the uncoated portions 124. Therefore, only the current collector pieces 130 may be produced on a large scale, thereby reducing the manufacturing costs of the secondary battery 100.

As illustrated in FIG. 6, an outermost current collector piece 130 may further include a welding plate 135 on its outer surface. As illustrated in FIG. 7, the welding plate 135 may have a wider area than the first regions 131. Therefore, when the welding plate 135 is welded to the current collector terminal 140, a welding area may be increased to facilitate welding performance of the current collector pieces 130. Consequently, welding efficiency may be enhanced using the welding plate 135.

Referring back to FIG. 1, the current collector terminal 140 may be provided in pair and may be coupled to the current collector piece 130, e.g., the current collector terminal 140 may be coupled to a side surface of the current collector piece 130. The current collector terminal 140 may be coupled to the first regions 131 of the current collector piece 130 to form an input/output path of charge/discharge voltages of the electrode assembly 120. The current collector terminal 140 may include a first plate 141 coupled to the current collector piece 130 in the first direction, e.g., along the y-axis, a second plate 142 extending from the first plate 141 in a second direction perpendicular to the first direction, e.g., along the x-axis, and an electrode terminal 143 protruding from the second plate 142 in the first direction. The electrode terminal 143 protrudes toward the upper portion of the cap plate 160 and is connected to a charge/discharge circuit. In addition, a male thread may be formed on an outer periphery of the electrode terminal 143 to facilitate engagement thereof to the nut 180.

The first plate 141 of the current collector terminal 140 may be coupled to the outermost current collector piece 130. For example, the first plate 141 of the current collector terminal 140 may surround the current collector piece 130. Here, the first plate 141 of the current collector terminal 140 may be coupled to the welding plate 135 of the current collector piece 130 by welding. In addition, the current collector piece 130 may be coupled to the first plate 141 of the current collector terminal 140 in a state in which it is compressed at opposite ends of the direction it is arranged. That is, welding may be performed without a gap between the current collector piece 130 and the current collector terminal 140. Therefore, welding efficiency of the current collector piece 130 and the current collector terminal 140 may be increased.

The first dielectric body 150 may be disposed at an upper portion of the current collector terminal 140. The first dielectric body 150 may be formed between the second plate 142 of the current collector terminal 140 and the cap plate 160. The first dielectric body 150 allows the current collector terminal 140 to be electrically independent of the cap plate 160. In addition, the first dielectric body 150 may include a terminal hole 151 formed at the interior thereof, thereby allowing the electrode terminal 143 of the current collector terminal 140 to upwardly protrude while passing through the terminal hole 151.

The cap plate 160 may be formed at an upper portion of the case 110 to seal the case 110. The cap plate 160 is coupled to the case 110 and prevents an electrolyte contained in the case 110 from leaking to the outside of the case 110. The cap plate 160 may include a terminal hole 161 formed at an interior thereof, thereby allowing the electrode terminal 143 to upwardly protrude while passing through the terminal hole 161. In addition, the cap plate 160 may have a vent 162 formed substantially at the center, thereby allowing the vent 162 to be opened earlier than other parts when internal gas is generated in the case 110 due to overcharging, and ultimately releasing the generated gas.

The second dielectric body 170 may be formed between the cap plate 160 and the electrode terminal 143 of the current collector terminal 140. The second dielectric body 170 allows the cap plate 150 to be electrically independent of the electrode terminal 143 of the current collector terminal 140. In addition, since the second dielectric body 170 is provided on the cap plate 160 as well, it allows the nut 180 to be electrically independent of the cap plate 160 during coupling of the nut 180.

The nut 180 may be formed at an upper portion of the second dielectric body 170. The nut 180 may include a female thread formed at the interior thereof and is engaged with the electrode terminal 143 of the current collector terminal 140. The nut 180 fixes the electrode terminal 143 of the current collector terminal 140, thereby fixing positions of the current collector terminal 140 and the electrode assembly 120.

As described above, the secondary battery 100 according to an embodiment may include a plurality of current collector pieces 130 arranged along the width direction of the uncoated portions 124. The uncoated portions 124 may be compressed by the current collector piece 130 during welding therebetween, thereby increasing welding efficiency. Here, the welding may be performed by butt welding, thereby further increasing the welding efficiency. In addition, since the uncoated portions 124 are exposed through the groove 133 of the current collector piece 130 during welding, the welding quality may be easily detected and evaluated externally, thereby ensuring welding reliability. Further, only the current collector pieces 130 may be produced on a large scale, regardless of the number and size of the electrode assembly 120, thereby reducing the manufacturing costs of the secondary battery 100.

Figure 10:
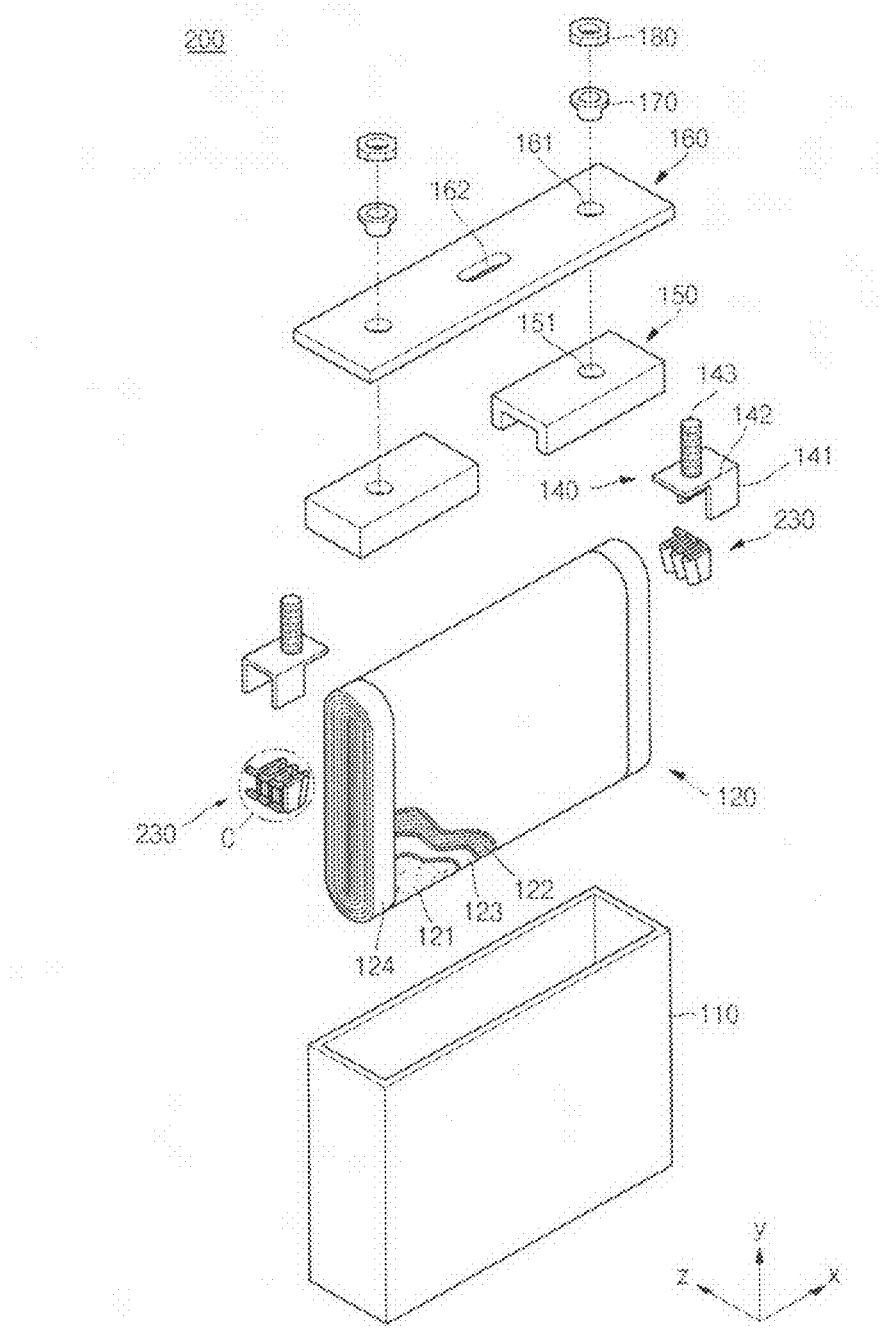
FIG. 10 illustrates an exploded perspective view of a secondary battery according to another embodiment.
Figure 11:
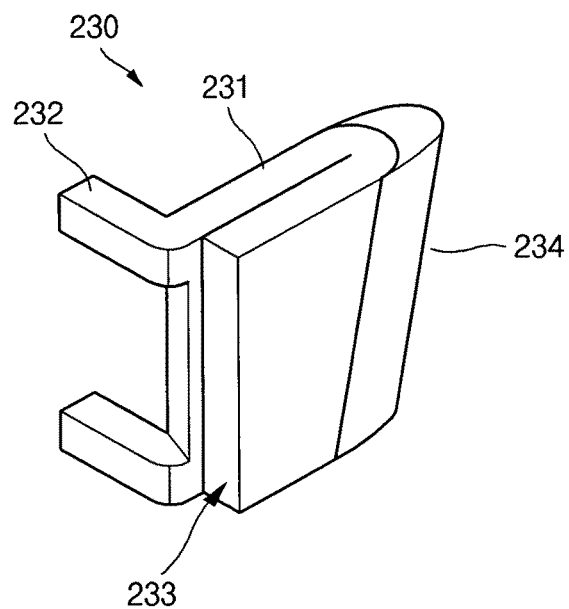
FIG. 11 illustrates an enlarged perspective view of a current collector piece in portion 'C' of FIG. 10.
Figure 12:
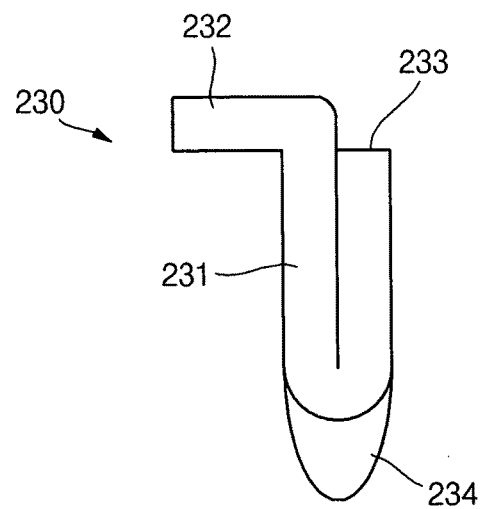
FIG. 12 illustrates a top plan view of the current collector piece of FIG. 11.
Figure 13:
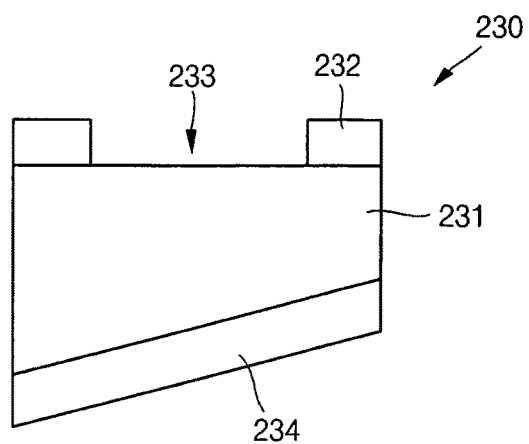
FIG. 13 illustrates a side view of the current collector piece of FIG. 11.
Figure 14:
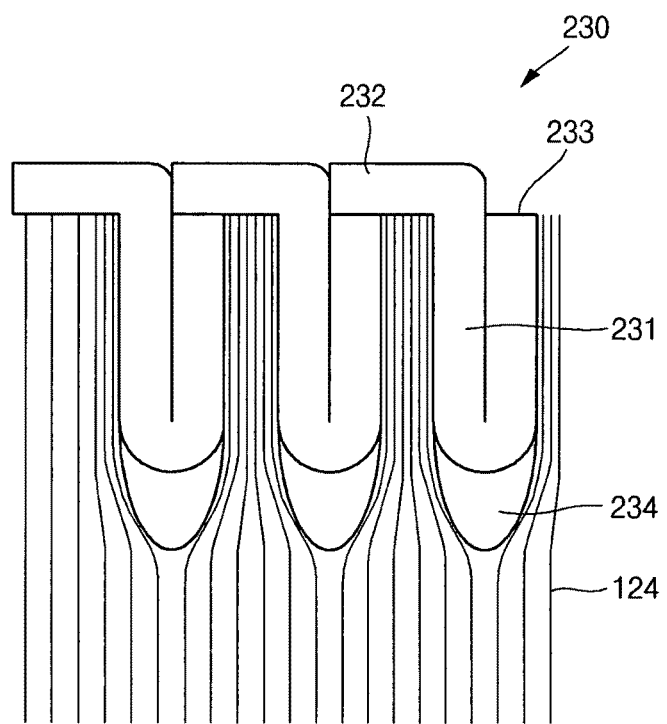
FIG. 14 illustrates a top plan view of uncoated portions coupled to the current collector piece of FIG. 11.

A secondary battery according to another embodiment will now be described with reference to FIGS. 10-14. FIG. 10 illustrates an exploded perspective view of a secondary battery according to another embodiment, FIG. 11 illustrates an enlarged perspective view of a current collector piece in the secondary of FIG. 10, FIG. 12 illustrates a top view of the current collector piece in FIG. 11, FIG. 13 illustrates a side view of the current collector piece in FIG. 11, and FIG. 14 illustrates a top view of uncoated portions coupled to current collector pieces in FIG. 11. For brevity, in the following embodiment, mostly differences between the present embodiment and the previous embodiment, i.e., the embodiment described previously with reference to FIGS. 1-9, will be described.

Referring to FIGS. 10 through 14, a secondary battery 200 may include the case 110, the electrode assembly 120, at least one current collector piece 230, the current collector terminal 140, the first dielectric body 150, the cap plate 160, the second dielectric body 170, and the nut 180.

The current collector piece 230 may be coupled to the uncoated portions 124 of the electrode assembly 120. The current collector piece 230 may be disposed between the uncoated portions 124. The current collector piece 230 may include a first region 231 inserted into the interior between the uncoated portions 124, and a second region 232 bent from first end portions, e.g., upper portions, of the first regions 231 and exposed to sections of the uncoated portions 124.

In detail, as illustrated in FIGS. 11-12, the first region 231 may be bent at a second end portion, e.g., lower portion, thereof. That is, the first region 231 may be bent to define two portions contacting each other in the xy-plane. The second end portion of the first region 231, i.e., the bent portion, may be inserted into the interior between the uncoated portions 124. As further illustrated in FIGS. 11 and 12, edges of the two portions of the first region 231 at the first ends thereof, i.e., edges opposite the bent portion, may be connected to the second region 232 and exposed, respectively. That is, an edge of one portion may be connected to the second region 232, and an edge of the second portion may be exposed to be coupled to a second region 232 of an adjacent current collector piece 230, thereby allowing the multiple current collector pieces 230 inserted into the interior between the uncoated portions 124 to be coupled to each other and fixed.

The second region 232 may be bent at an upper portion of the first region 231. The second region 232 may be formed at an angle of approximately 90 degrees with respect to the first region 231. The second region 232 may be coupled to a protruding end of a first region 231 of an adjacent current collector piece 230, thereby easily coupling and fixing the multiple current collector pieces 230 to each other.

In addition, the current collector piece 230 may include a groove 233 and an insertion member 234 having a curved surface of a smaller curvature than that of each of the first regions 231. The insertion member 234 may be coupled to the bent portion of the first region 231. That is, the insertion member 234 may taper toward its lower portion which is inserted into the uncoated portions 124 (FIG. 13). Since the insertion member 234 has a smaller width than the bent portions of the first regions 231, the current collector piece 230 may be easily inserted into the interior between the uncoated portions 124, as illustrated in FIG. 14.

Figure 15:
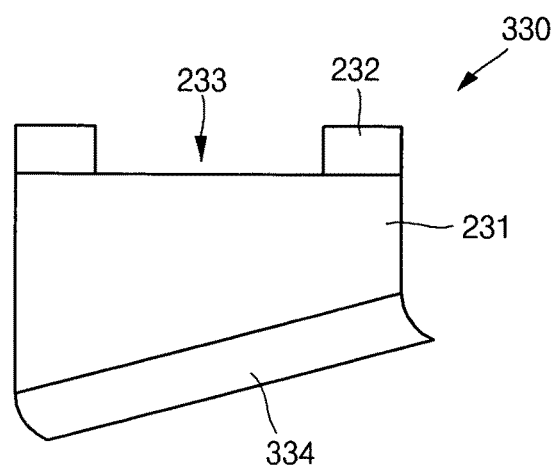
FIG. 15 illustrates a side view of a current collector piece in a secondary battery according to another embodiment.

A secondary battery according to still another embodiment will now be described with reference to FIG. 15. FIG. 15 illustrates a side view of a current collector piece in a secondary battery according to still another embodiment.

Referring to FIG. 15, the secondary battery may include a current collector piece 330. The current collector piece 330 may include an insertion member 334 formed at a second end of the first region 231. Like in the previous embodiment, the insertion member 334 of the current embodiment may have a curved surface of a smaller curvature than that of the first region 231. Therefore, since the insertion member 234 has a smaller width than the lower portion of the first regions 231, the current collector piece 230 may be easily inserted into the interior between the uncoated portions 124.

In addition, the insertion member 334 may be curved at its bottommost end that is the first to be coupled to the uncoated portions 124. Therefore, when the insertion member 334 is inserted into the interior between the uncoated portions 124, it can be inserted into surfaces of the uncoated portions 124 in a slidable manner along the curved surface. In such a manner, the insertion member 334 may be easily coupled to the uncoated portions 124 and may prevent the uncoated portions 124 from being damaged during insertion.

As described above, a secondary battery according to an embodiment may include a plurality of current collector pieces arranged along a width direction of uncoated portions of an electrode assembly. The uncoated portions may be compressed by the current collector pieces during welding, e.g., butt welding, therebetween, thereby increasing welding efficiency. In addition, the uncoated portions may be exposed through a groove in a current collector piece, thereby facilitating external monitoring of the welding and ensuring welding reliability. Further, since only current collector pieces may be produced on a large scale, regardless of the number and size of the electrode assembly, the manufacturing costs of the secondary battery may be reduced. Also, the secondary battery according to an embodiment may include an insertion member having a curved surface at its bottom surface to facilitate insertion of the current collector pieces into the interior between uncoated portions, thereby enhancing the yield of the secondary battery and preventing the uncoated portions from being damaged. In contrast, it may be difficult to externally check welding quality of a current collector plate and uncoated portions of an electrode assembly in a conventional secondary battery, and the welding efficiency in the conventional secondary battery may be poor Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   a case including an internal space;
   at least one electrode assembly in the case, the electrode assembly including a separator between a positive electrode plate and a negative electrode plate, and the positive and negative electrode plates including uncoated portions at edges of the electrode assembly;
   a plurality of individual current collector pieces along a same edge of the electrode assembly and coupled to the uncoated portions of the electrode assembly, each current collector piece being inserted into an interior region of the uncoated portions;
   a current collector terminal coupled to the current collector piece and protruding to an upper portion of the case; and
   a cap plate coupled to the upper portion of the case,
   wherein each current collector piece includes:
      only one pair of first regions inserted into the interior region of the uncoated portions, the pair of first regions being spaced apart from each other to define a space therebetween, each of the first regions including an inclined surface inserted into the interior region of the uncoated portions, and
      a second region connecting edges of the pair of the first regions to each other, the second region connecting edges of the first regions opposite to the inclined surfaces, and wherein each first region of each current collector piece includes:
      a first surface facing and defining the space between the pair of the first regions,
      a second surface parallel to the first surface, and
      the inclined surface connecting the first and second surfaces, the inclined surface defining an obtuse angle with the first surface and an acute angle with the second surface.

2. The secondary battery as claimed in claim 1, wherein the current collector piece has a smaller width than the uncoated portions.

3. The secondary battery as claimed in claim 1, wherein the plurality of current collector pieces are discrete pieces arranged along a width direction of the uncoated portions along at least one edge of the electrode assembly, each current collector piece being inserted between adjacent segments of the uncoated portions.

4. The secondary battery as claimed in claim 1, wherein a segment of the uncoated portions is in the space between the pair of the first regions.

5. The secondary battery as claimed in claim 4, wherein a part of the segment of the uncoated portions in the space between the pair of the first regions is exposed between two portions of the second region via a groove.

6. The secondary battery as claimed in claim 5, wherein the uncoated portions are welded to the current collector pieces via the groove.

7. The secondary battery as claimed in claim 1, wherein the current collector piece includes:
   the first region having a first end inserted into the interior region of the uncoated portions; and
   the second region bent from a second end of the first region and exposed to an exterior of the uncoated portions, the first and second ends being opposite each other.

8. A secondary battery, comprising:
   a case including an internal space;
   at least one electrode assembly in the case, the electrode assembly including a separator between a positive electrode plate and a negative electrode plate, and the positive and negative electrode plates including uncoated portions at edges of the electrode assembly;
   a plurality of individual current collector pieces along a same edge of the electrode assembly and coupled to the uncoated portions of the electrode assembly, each current collector piece being inserted into an interior region of the uncoated portions;
   a current collector terminal coupled to the current collector piece and protruding to an upper portion of the case; and
   a cap plate coupled to the upper portion of the case,
   wherein each current collector piece includes:
      a pair of first regions inserted into the interior region of the uncoated portions, the pair of first regions being connected to each other at first ends thereof in the interior region of the uncoated portions, and
      a second region bent from a second end of one first region of the pair of first regions, the second region being exposed to an exterior of the uncoated portions, and the first and second ends being opposite each other, and
   wherein the pair of first regions is bent at the first ends thereof toward each other to define a curve, and the second ends of the pair of first regions include an exposed edge and an edge connected to the second region.

9. The secondary battery as claimed in claim 3, wherein the pair of first regions are parallel to a major surface of the case.

10. The secondary battery as claimed in claim 8, further comprising an insertion member on the curve of the first ends of the first regions, the insertion member having a curved surface of a smaller curvature than the curve of the first ends of the first regions, and the insertion member being coupled to the first end of the first region.

11. The secondary battery as claimed in claim 10, wherein the insertion member tapers toward its lower portion, the lower portion being inserted in the interior region of the uncoated portions.

12. The secondary battery as claimed in claim 10, wherein a bottommost end of the insertion member is curved.

13. The secondary battery as claimed in claim 8, wherein the second region in each current collector piece contacts only one of the pair of the first regions in a same current collector piece.

14. The secondary battery as claimed in claim 9, wherein a number of the discrete current collector pieces is an integer corresponding to a quotient of a width of the uncoated portions divided by a length of one current collector piece.

15. The secondary battery as claimed in claim 1, wherein the current collector piece includes:
the first region extending into the interior region of the uncoated portions, the first region extending in parallel to a major surface of the case and overlapping the uncoated portions; and
the second region connected to the first region and perpendicular thereto, the second region being connected to an external region of the uncoated portions.

16. The secondary battery as claimed in claim 15, wherein the second region includes a groove between parts of the second region, the parts of the second region protruding further than the groove.

17. The secondary battery as claimed in claim 1, wherein the second surface in the first region of each current collector piece includes an edge portion, the edge portion including a vertex protruding away from the second region toward the interior region of the uncoated portions as viewed in a plane defined by the second surface, the inclined surface of each first region extending from a respective edge portion toward the space between the pair of first regions.

18. The secondary battery as claimed in claim 1, wherein a segment of the uncoated portions is slidable along the inclined surface into the space defined between the pair of the first regions.

19. The secondary battery as claimed in claim 1, wherein the inclined surface with the second surface of the first region define a sharp edge insertable into the interior region of the uncoated portions, the sharp edge extending along an approximate direction of the current collector terminal.

20. The secondary battery as claimed in claim 1, wherein:
an outside surface of each first region is flat, and
an entirety of the outside surface of at least one of the first regions of each of the current collector pieces directly contacts a respective flat outside surface of a first region of an adjacent current collector piece with no gap between the respective flat outside surfaces.

\* \* \* \* \*